US012445070B2

United States Patent
Turcan et al.

(10) Patent No.: US 12,445,070 B2
(45) Date of Patent: Oct. 14, 2025

(54) USING A DEADTIME INTERVAL FOR BACK EMF ACQUISITION AND MEASUREMENT

(71) Applicant: Microchip Technology Incorporated, Chandler, AZ (US)

(72) Inventors: Gheorghe Turcan, Bucharest (RO); Grig Barbulescu, Rosu-Chiajna (RO)

(73) Assignee: Microchip Technology Incorporated, Chandler, AZ (US)

( * ) Notice: Subject to any disclaimer, the term of this patent is extended or adjusted under 35 U.S.C. 154(b) by 272 days.

(21) Appl. No.: 18/202,368

(22) Filed: May 26, 2023

(65) Prior Publication Data

US 2024/0039438 A1 Feb. 1, 2024

Related U.S. Application Data

(60) Provisional application No. 63/392,973, filed on Jul. 28, 2022.

(51) Int. Cl.
*H02P 6/182* (2016.01)
*H02P 6/10* (2006.01)
*H02P 27/08* (2006.01)

(52) U.S. Cl.
CPC ............... *H02P 6/182* (2013.01); *H02P 6/10* (2013.01); *H02P 27/08* (2013.01)

(58) Field of Classification Search
CPC ............ H02P 6/182; H02P 6/10; H02P 27/08
See application file for complete search history.

(56) References Cited

U.S. PATENT DOCUMENTS

| 6,249,094 B1 * | 6/2001 | Zeh | H02P 6/182 318/400.36 |
| 9,985,560 B2 | 5/2018 | Hijikata | |
| 2014/0306637 A1 * | 10/2014 | Wu | H02P 21/20 318/504 |
| 2015/0130378 A1 | 5/2015 | Sugiura | 318/400.13 |

FOREIGN PATENT DOCUMENTS

| DE | 102016110428 | * 12/2016 |
| DE | 102016110428 A1 | 12/2016 |
| WO | 2020/121368 A1 | 6/2020 |
| WO | WO2020121368 | * 6/2020 |

OTHER PUBLICATIONS

Translation of WO2020121368 has been attached.*
Translation of DE102016110428 has been attached.*
International Search Report and Written Opinion, Application No. PCT/US2023/028775, 13 pages, Nov. 16, 2023.

* cited by examiner

*Primary Examiner* — Zoheb S Imtiaz
(74) *Attorney, Agent, or Firm* — SLAYDEN GRUBERT BEARD PLLC

(57) ABSTRACT

An apparatus and method for determining electrical characteristics has an acquisition circuit and a control circuit. The control circuit causes a first modulation circuit to issue a first set of modulated signals to a first source of alternating current energy, wherein the first set of modulated signals has a first deadtime and wherein a high side switch and a low side switch of the first modulation circuit are turned off. The control circuit further causes the acquisition circuit to acquire a first electrical characteristic of the first source of alternating current energy from the first source of alternating current energy during the first deadtime.

14 Claims, 7 Drawing Sheets

USING A DEADTIME INTERVAL FOR BACK EMF ACQUISITION AND MEASUREMENT

RELATED APPLICATIONS

This application claims priority to commonly owned U.S. Provisional Patent Application Ser. No. 63/392,973; filed Jul. 28, 2022; entitled "Using a Deadtime Interval for Back EMF Acquisition and Measurement" and is hereby incorporated by reference herein for all purposes.

FIELD OF THE INVENTION

The present disclosure relates to electrical power control and measurement and, more particularly, to using a deadtime interval in pulsed-width modulation (PWM) switching for back electromotive force (BEMF) acquisition and measurement.

BACKGROUND

When a voltage or other electromotive force is applied to a motor's armature, current begins to flow, creating a magnetic force which causes the armature to rotate. A counter force in the form of eddy currents may be generated by the armature rotating in the magnetic field. This counter force may be referred to as BEMF. Measurement, or detection, of the BEMF, may enable recognition of the zero crossing information for BEMF, which zero crossing information can be used to create a feedback loop for motor control. BEMF zero crossing detection may be helpful in providing for position detection.

There are several approaches to controlling or driving an electromagnetic motor. Inventors of examples of the present disclosure have discovered several advantages and disadvantages to such approaches. Using block commutation drive with trapezoidal BEMF measurement control, wherein the feedback signals to PWM circuits are in the form of a trapezoid, may have disadvantages including torque ripple at every commutation, susceptibility to acoustic and electric noise, and less torque may be produced compared to other methods. However, the control algorithms are simple and not mathematically intense, and measuring BEMF is relatively simple. Using sinusoidal PWM modulation drive, which may benefit from the field-oriented control (FOC) method, has disadvantages that may include always having three phases active on at the same time, higher switching losses, and control algorithms and BEMF measurement may be complex and mathematically intensive. Often using such an approach may require specialized processing such as with a digital signal processor (DSP). Using sensors for feedback may have disadvantages including a higher bill of materials (BOM) and complex mechanical implementation.

DETAILED DESCRIPTION

Figure 1:
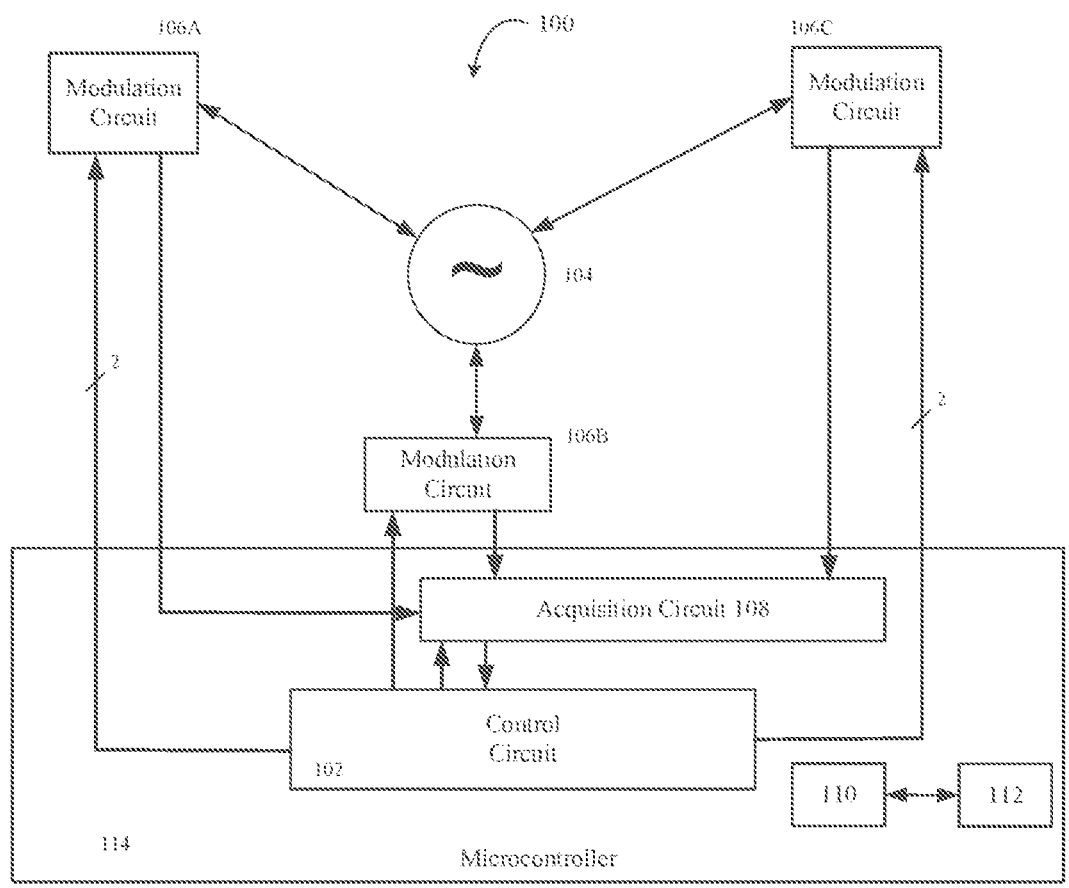
FIG. 1 is an illustration of an example system using the deadtime interval in complementary PWM switching for the purpose of BEMF acquisition and measurement, according to examples of the present disclosure.

Inventors of examples of the present disclosure have discovered that driving a motor with a microcontroller of limited computational power, such as with an 8-bit microcontroller with limited memory and processor speed, may make it difficult to implement the FOC control method. Furthermore, many applications which utilize hall sensors or trapezoidal control have disadvantages as described above. Inventors of examples of the present disclosure have discovered solutions to one or more of the above problems.

Examples of the present disclosure may enable using microcontrollers with limited resources, such as an 8-bit microcontroller, to drive a motor without sensors and using sinusoidal PWM modulation without the need of FOC. Examples of the present disclosure may include measuring electrical characteristics, such as BEMF, of a source, such as a motor, by generating deadtime in respective modulation circuits, such as PWM circuits, wherein both PWM switches are inactive, non-conducting, or open. The deadtime may be common among multiple modulation circuits and the acquisition of the electrical characteristics measurements are made during this deadtime. The deadtime may be artificially lengthened. The examples of the present disclosure may permit electrical characteristics measurement for accurate BEMF zero-cross time acquisition. The examples of the present disclosure may be used with any sinusoidal drive method that use PWM modulation. The electrical characteristics measurement is done at the PWM modulation frequency, which is usually at least 8 times faster than the modulated sinusoidal signal, which may permit accurate detection and fast response. This method of electrical characteristics acquisition may also be used in on-grid sinusoidal inverters.

Examples of the present disclosure may include a manner of asymmetric deadtime PWM drive or control signals that allow for a non-disturbing BEMF measurement/acquisition window. The drive control signals may be asymmetric in that deadtime may have different lengths depending on the modulation signal, such as a PWM signal, and a part of a modulation cycle in which the deadtime appears. For example, short deadtimes may be hundreds of nanoseconds long, while long deadtimes may be microseconds long. The BEMF measurement/acquisition window may be non-disturbing in that, with other approaches such as a trapezoidal approach, disturbances of a BEMF signal may arise from other phases while measuring one phase, but in examples of the present disclosure, switches in all phases may be off and thus avoid the possibility of causing disturbances. The BEMF measurement/acquisition window may be smaller and distributed compared to drive with space vector pulse width modulation or trapezoidal drive, wherein drive signals may be stopped for 33% of the modulated driving signal. In contrast, the drive signals may be stopped for 5% of the modulated driving signal period in examples of the present disclosure. The measurement/acquisition window may be distributed in that, in trapezoidal control, measurements/acquisitions are made of slopes of rising or falling edges, which may amount to up to a third of measurement/acquisition windows, while in examples of the present disclosure, the measurements are distributed along the entirety of the phase wherein all switches are inactive or off. However, in some embodiments, less than the entirety of the phase wherein all switches are inactive may be used. Examples of the present disclosure may facilitate sinusoidal drive to motors, wherein high torque is preserved. Examples of the present disclosure may facilitate commutations without inducing torque ripples. Commutations may include switching operations in PWM circuits. Examples of the present disclosure may drive using a waveform that is close to a sinusoidal waveform of the current and magnetic field, which might avoid torque ripples that may occur with trapezoidal drive signals. Examples of the present disclosure may facilitate reduction in mechanical, acoustic, or electrical noise compared to using trapezoidal drives. Examples of the present disclosure may facilitate accurate zero-cross detection, wherein the measured signal, such as a BEMF signal, goes from being negative to positive current, or vice-versa, in a given modulation circuit. Examples of the present disclosure may facilitate simple motor control algorithm implemented with microcontrollers with limited resources, such as an 8-bit microcontroller. Examples of the present disclosure may facilitate a solution that has the advantages of trapezoidal control together with the advantages of sinusoidal control. Examples of the present disclosure may facilitate a simple control algorithm. For example, BEMF zero-crossings may be determined from simple comparisons of the BEMF signal at a given modulation circuit with a reference signal.

FIG. 1 is an illustration of an example system 100 using a deadtime interval in PWM switching for electrical characteristics acquisition and measurement, such as determining a BEMF signal's zero-cross point or other information, according to examples of the present disclosure.

System 100 may include a control circuit 102 and an acquisition circuit 108. Control circuit 102 and/or acquisition circuit 108 may be implemented in any suitable manner, such as by analog circuitry, digital circuitry, control logic, instructions in a memory 110 for execution by a processor 112, digital logic circuits programmed through hardware description language, application specific integrated circuits (ASIC), field programmable gate arrays (FPGA), programmable logic devices (PLD), or any suitable combination thereof, whether in a unitary device or spread over several devices. The control circuit 102 may be part of a microcontroller 114 comprising a processor 112 coupled with a memory 110. The control circuit 102 and/or acquisition circuit 108 may be peripherals of microcontroller 114 or may be formed by peripherals, I/O circuits, memory 110, and the processor 112.

Control circuit 102 may perform or cause performance of control and/or measurement of any suitable entity that may generate an alternating current, such as for example, BEMF. Such an entity may be represented in FIG. 1 as a source of alternating current energy 104, which may for example, be a BEMF source 104. In various examples, alternating current energy source 104 or BEMF source 104 may include or be implemented by, for example, an inverter, a single-phase electromagnetic motor, or a three-phase electromagnetic motor. In the example of FIG. 1, BEMF source 104 may be implemented as a three-phase electromagnetic motor. BEMF source 104 may spin when an electromotive force is applied thereto, for example, by issuing a first set of modulated signals to a first source of alternating current energy 104, for example, a winding of a single-phase electromagnetic motor or a first winding of a three-phase motor, thus driving BEMF source 104. In one example, control circuit 102 may cause BEMF of BEMF source 104 to be measured when BEMF source 104 is not being driven. BEMF source 104 may generate BEMF. In one example, control circuit 102 may cause BEMF source 104 to operate so as to generate BEMF. In one example, the first set of modulated signals comprises a first deadtime, during which a high side switch and a low side switch of a first modulation circuit are turned off, and the BEMF generated by BEMF source 104 may be acquired during this deadtime when the alternating current energy source 104 is not being driven. To this end, the acquisition circuit 108 acquires a first electrical characteristic, e.g., a BEMF signal of the first source of alternating current energy is measured during the first deadtime. BEMF source 104 may be included in system 100 or may be implemented separately from system 100.

In a further example, the alternating current energy source 104 may comprise a second source, for example a second winding of a dual-phase motor. In this example, a second modulation circuit may issue a second set of modulated signals to the second source of alternating current energy, the second set of modulated signals having a second deadtime wherein a high side switch and a low side switch of the second modulation circuit are turned off. The second deadtime is synchronous with the first deadtime. In this example, the acquisition circuit 108 acquires a second electrical characteristic of the second source of alternating current energy from the second source of alternating current energy during the second deadtime.

In yet a further example, the alternating current energy source 104 may comprise a third source, for example a third winding of a three-phase motor. In this example, a third modulation circuit may issue a third set of modulated signals to a third source of alternating current energy, the third set of modulated signals having a third deadtime wherein a high side switch and a low side switch of the third modulation circuit are turned off. The third deadtime is synchronous with the first deadtime and the second deadtime. The acquisition circuit 108 acquires a third electrical characteristic of the third source of alternating current energy from the third source of alternating current energy during the third deadtime.

The present examples are not limited to single-phase, dual-phase, or three-phase alternating sources, such as electromagnetic motors, and can be readily adapted for any number of phases.

BEMF source 104 may be implemented within microcontroller 114 or outside of microcontroller 114. When BEMF source 104 is implemented as a motor, the measured signals may be the BEMF voltage or the motor current through the coils generated by BEMF source 104 when BEMF source 104 is in mechanical motion but not being electrically driven.

Figure 2:
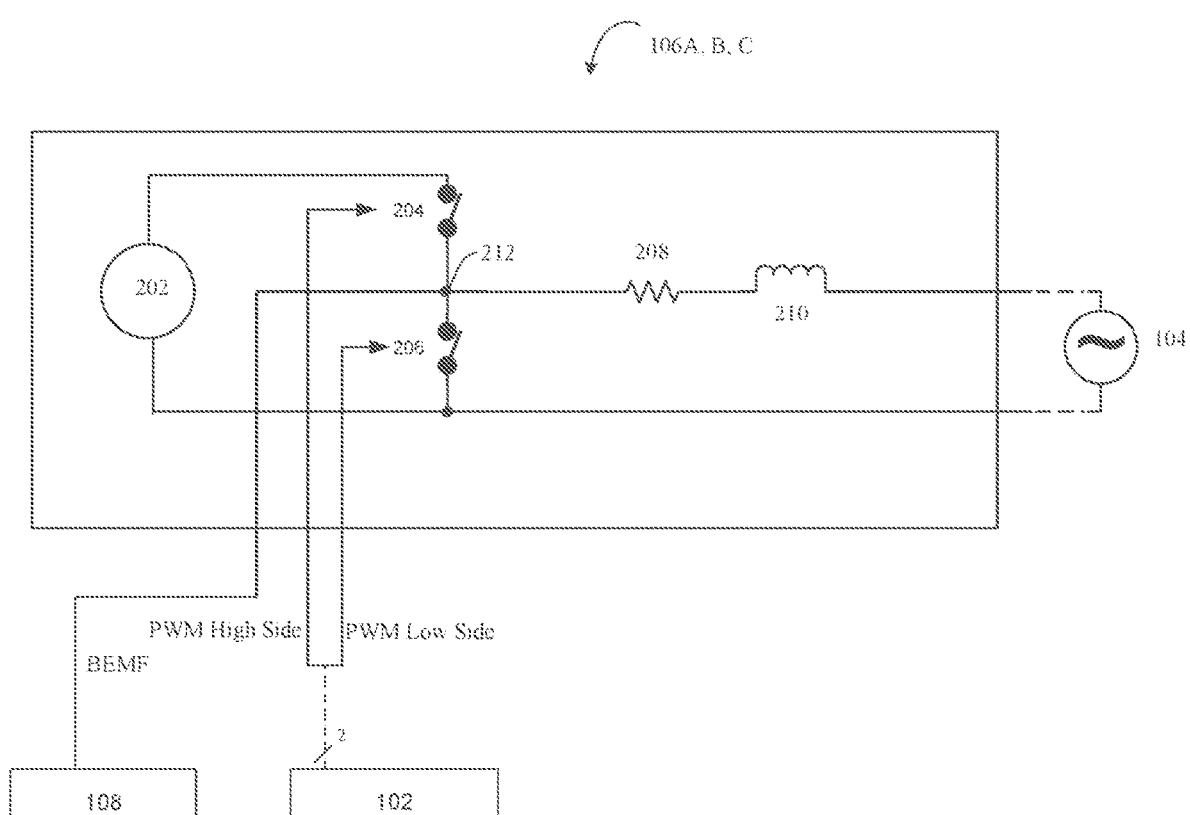
FIG. 2 is an illustration of an example PWM circuit using a deadtime interval for BEMF acquisition and measurement, according to examples of the present disclosure.

Control circuit 102 may utilize any suitable mechanisms to control the operation of BEMF source 104. Such operations may include driving BEMF source 104. Driving BEMF source 104 may include causing an electromotive force to be applied to BEMF source 104 in any suitable manner. In one example, driving BEMF source 104 may be performed by using modulation signals, such as PWM signals or a PWM power source. Any suitable mechanism may be used to apply a PWM power source to BEMF source 104. For example, modulation circuits can be formed by circuits 106A, 106B, 106C (hereinafter collectively referred to as circuits 106) which may in some embodiments may be PWM circuits and may be used to apply a PWM power source to BEMF source 104. A more detailed illustration of an example implementation of an instance of one of the modulation/PWM circuits 106 is shown in FIG. 2, discussed in more detail below. Although three modulation/PWM circuits 106 are shown in FIG. 1, as mentioned above, any suitable number and kind of modulation/PWM circuits 106 may be used. Modulation/PWM circuits 106 may be implemented in any suitable manner, such as by analog circuitry, digital circuitry, control logic, digital logic circuits programmed through hardware description language, ASICs, FPGAs, PLDs, or any suitable combination thereof, whether in a unitary device or spread over several devices. While shown as separate circuits in FIG. 1, modulation/PWM circuits 106 may be peripheral devices within microcontroller 114. Microcontroller 114 may comprise instructions in memory 110 for execution by processor 112 to implement the modulation/PWM circuits 106. External or internal driver circuits may receive output signals from the modulation/PWM circuits 106 to drive source 104. PWM circuits 106 may be implemented as, for example, switched mode power supplies. In one example, system 100 may include one or more PWM circuits 106. In various examples, PWM circuits 106 may be implemented control circuit 102, or outside of control circuit 102. PWM circuits 106 may be provided for each phase of the three-phase operation of BEMF source 104. PWM circuits 106 may each provide power in a respective phase of the operation of BEMF source 104. PWM circuits 106 may provide a regulated voltage to BEMF source 104 that is regulated by switching a power source therein, or coupled to the respective PWM circuit 106, on and off at a frequency that causes the regulated voltage. PWM circuits 106 may be controlled by any suitable entity, such as control circuit 102.

Control circuit 102 may utilize any suitable mechanisms to acquire or measure or to cause acquisition or measurement of electrical characteristics, such as BEMF, from BEMF source 104. Measurement of BEMF may be made from, for example, any suitable part of PWM circuits 106. A more detailed illustration of an example implementation of an instance of PWM circuit 106 is shown in FIG. 2, discussed in more detail below, including where such measurements may be made. The measurements may be made by an acquisition circuit 108. Although a single acquisition circuit 108 is shown, any suitable number and kind of acquisition circuits 108 may be used. Acquisition circuit 108 may be implemented in any suitable manner, such as by analog circuitry, digital circuitry, control logic, instructions in memory 110 for execution by processor 112, digital logic circuits programmed through hardware description language, ASICs, FPGAs, PLDs, or any suitable combination thereof, whether in a unitary device or spread over several devices. In various examples, acquisition circuit 108 may be implemented within system 100 with control circuit 102, or outside of system 100 and control circuit 102. Acquisition circuit 108 may receive input or measurements from respective ones of PWM circuits 106. Acquisition circuit 108 may be controlled by any suitable entity, such as control circuit 102. Acquisition circuit 108 may comprise analog comparators, analog-to-digital converters, digital comparators or any combination thereof.

FIG. 2 is an illustration of an example PWM circuit 106 for using a deadtime interval in PWM switching for BEMF acquisition and measurement, according to examples of the present disclosure.

PWM circuit 106A, 106B, and 106C may respectively include two terminal interfaces or lines to the respective interface at BEMF source 104. PWM circuit 106 may provide a voltage to BEMF source 104. The amount of the voltage may be regulated according to switching control signals received from control circuit 102. FIG. 2 shows example signals "PWM High Side" and "PWM Low Side" switching control signals.

PWM circuit 106A, B, C may include or be coupled to, a DC voltage source 202. The voltage of DC voltage source may be a given voltage, and the regulated voltage provided by PWM circuit to BEMF source 104 may be modulated down from the voltage of DC voltage source 202. PWM circuit 106 may include a high side switch 204 and a low side switch 206, for example, implemented by MOSFETs or any other suitable switching devices. When high side switch 204 is closed and low side switch 206 is open or non-conducting, DC voltage from DC voltage source 202 may be applied to a first terminal of BEMF source 104. When high side switch 204 is open or non-conducting and low side switch 206 is closed or conducting, ground may be applied to the first terminal of BEMF source 104. Thus, the frequency of switching, and the relative time wherein high side switch 204 is closed and low side switch 206 is open compared to wherein high side switch 204 is open and low side switch 206 is closed may define the amount of the modulated voltage that is to be provided to BEMF source 104. In other applications, an amount of deadtime, wherein both high side switch 204 is open and low side switch 206 is open, may be reduced so as to increase the efficiency of PWM circuit 106A, B, C. Power may be applied to the first terminal of BEMF source 104 from PWM circuit 106A, B, C through a midpoint 212 between high side switch 204 and low side switch 206.

PWM circuit 106 may include a resistor 208 and an inductor 210 connected in series between midpoint 212 and BEMF source 104, wherein the inductor represents a motor winding. Inclusion of resistor 208 and inductor 210 may cause a substantially constant current stream to be provided to or from BEMF source 104.

High side switch 204 may be controlled through a PWM high side control signal received from control circuit 102. Low side switch 206 may be controlled through a PWM low side control signal received from control circuit. A BEMF measurement signal may be output from midpoint 212 to acquisition circuit 108.

In one example, the PWM control signals received from control circuit 102 may designate that both low side switch 206 and high side switch 204 are to be open for a period of time. This period of time may be referred to as deadtime. Moreover, the PWM control signals issued by control circuit 102 to all three instances of PWM circuit 106, namely, PWM circuit 106A, PWM circuit 106B, PWM circuit 106C, and may cause deadtime in respective ones of PWM circuits 106 simultaneously for a deadtime period.

According to various examples, the first, second, and third set of modulated signals can be used to drive a motor or inverter that includes the first, second, and third sources of BEMF. According to some examples, the first, second, and third set of modulated signals are used as a sinusoidal drive of a motor that includes the first, second, and third sources of BEMF.

Returning to FIG. 1, in one example, acquisition circuit 108 may take a measurement of BEMF from respective ones of PWM circuits 106 during the deadtime period common to all of PWM circuits 106. Acquisition circuit 108 may make such a measurement based upon a control signal from control circuit 102. Moreover, control circuit 102 may cause the deadtime period common to all of PWM circuits 106. Control circuit 102 may lengthen or extend the deadtime period compared to other PWM implementations. Thus, control circuit 102 may cause deadtime in PWM circuits 106 and may cause capturing or measuring BEMF signal during such deadtime. The deadtime may be configurable and may be defined by, for example, values in registers, settings, user commands, or other suitable entities.

Figure 3:
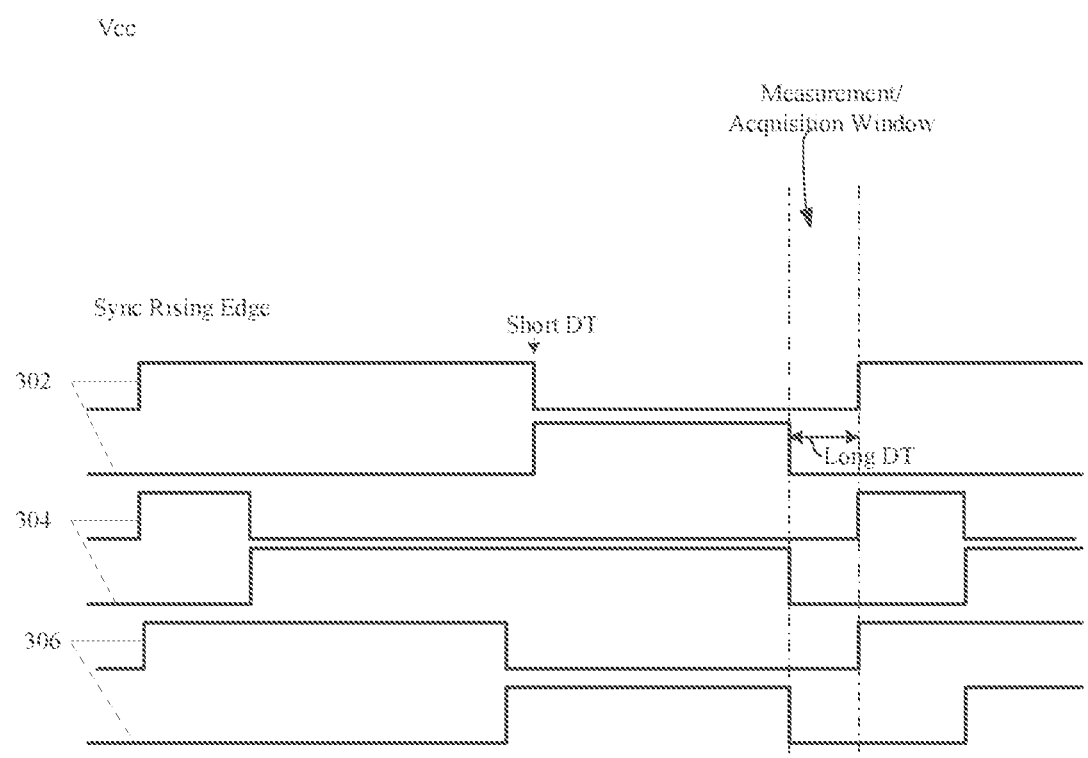
FIG. 3 is an illustration of PWM signals across all three instances of the PWM circuits of FIG. 2, according to examples of the present disclosure.

FIG. 3 is an illustration of PWM signals across all three instances of PWM circuits 106, according to examples of the present disclosure.

Illustrated in FIG. 3 are three trace sets 302, 304, 306, corresponding to PWM control signals for PWM circuits 106A, 106B, 106C, respectively, wherein the respective switches are in the closed state when the respective PWM control signal is high, and in the open state when the respective PWM control signal is low. Trace sets 302, 304, 306 may respectively include a pair of control signals from control circuit 102 indicating control signals for high side switch 204 and low side switch 206 in a respective one of PWM circuits 106A, 106B, 106C.

As shown in FIG. 3, in a given PWM cycle, a first rising edge for the control signal for high side switch 204 in respective ones of PWM circuits 106A, 106B, 106C may occur simultaneously, denoted by synchronized rising edge, denoted "Sync Rising Edge". Thus, a rising first edge of a modulation cycle of the first set of modulated signals 302 and a rising first edge of the second and/or third set of modulated signals 304 and/or 306 are synchronous. Moreover, within a single one of traces 302, 304, 306, there may be a short deadtime 310 wherein both the control signals for high side switch 204 and low side switch 206 in a respective one of PWM circuits 106A, 106B, 106C may be low, causing both switches to be open. However, the other trace sets, i.e., trace sets 304, 306, may indicate that the switches in the other PWM circuits 106 are not necessarily both open at short deadtime 310.

Instead, at a given point in the PWM cycle, such as at the end of the PWM cycle, all six control signals—those for high side switch 204 and low side switch 206 in each of PWM circuits 106A, 106B, 106C—may be low, such that the respective switches are all open during a long deadtime 308. This period of long deadtime 308, in which PWM circuits 106 have their respective high side switch 204 and low side switch 206 open, may represent a measurement/acquisition window in which acquisition circuit 108 may measure BEMF from BEMF source 104. This period of deadtime may be longer than any of the other periods of short deadtime 310 of individual ones of PWM circuits 106 wherein the operation of the individual PWM circuit 106A, B, C changes from providing the voltage of the voltage source to providing ground for BEMF source 104.

Thus, all six driving control signals provided by control circuit 102 to PWM circuits 106 may be logically low simultaneously during the measurement/acquisition window and the long deadtime 308. During this time, inductor 210 in respective PWM circuits 106 might not be driven. The signal measured, after considering propagation delays, may be the BEMF of BEMF source 104.

As shown in FIG. 3, the first set of modulated signals 302 can have a first short deadtime 310 wherein the high side switch and the low side switch of the first modulation circuit are open, the second set of modulated signals 304 can have a second short deadtime wherein the high side switch and the low side switch of the second modulation circuit are open; and the first and second short deadtimes are at different times than the first long deadtime or the second long deadtime, respectively.

Measurement of BEMF may be performed in any suitable manner, and use of BEMF may be used for any suitable determination and may comprise comparing a BEMF signal to a predefined value, measuring a value of a BEMF signal with an analog-to-digital converter, comparing a measured digital result to a digital value or any other suitable method.

Figure 4:
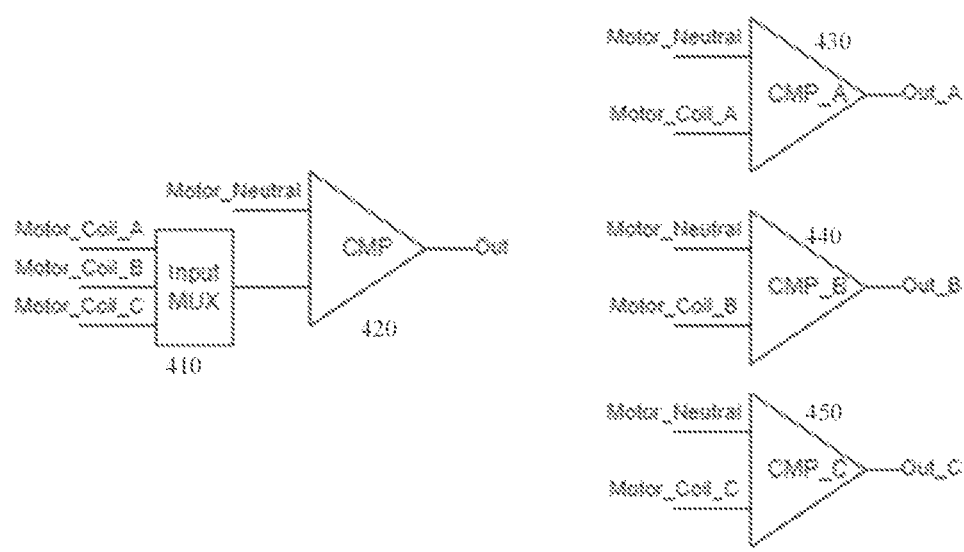
FIG. 4 is an illustration of example measurement components of a measurement circuit, according to examples of the present disclosure.

FIG. 4 is an illustration of example components of acquisition circuit 108, according to examples of the present disclosure.

A comparator 420 or multiple comparators 430, 440, 450 may be used to measure the BEMF signal contributed or observed at respective ones of PWM circuits 106. Measurements from midpoints 212 of respective PWM circuits 106 may be provided to measurement circuit 108. The respective measurement of midpoint 212 may be referred to as Motor_Coil_A, Motor_Coil_B, and Motor_Coil_C. These may be summed, then averaged to determine a neutral motor reference value, Motor_Neutral. Motor_Neutral may be used to compare against each of Motor_Coil_A, Motor_Coil_B, and Motor_Coil_C. The comparison of these may be used to determine whether or not the current of the BEMF is into BEMF source 104 or is out from BEMF source 104. The comparators may be implemented as individual comparators 430, 440, 450 that are used to compare the neutral motor reference against individual measurements from PWM circuits 106, or the individual measurements from PWM circuits 106 may be multiplexed by multiplexer 410 and compared against the neutral motor reference one at a time by a single comparator 420 as shown in FIG. 4.

Figure 5:
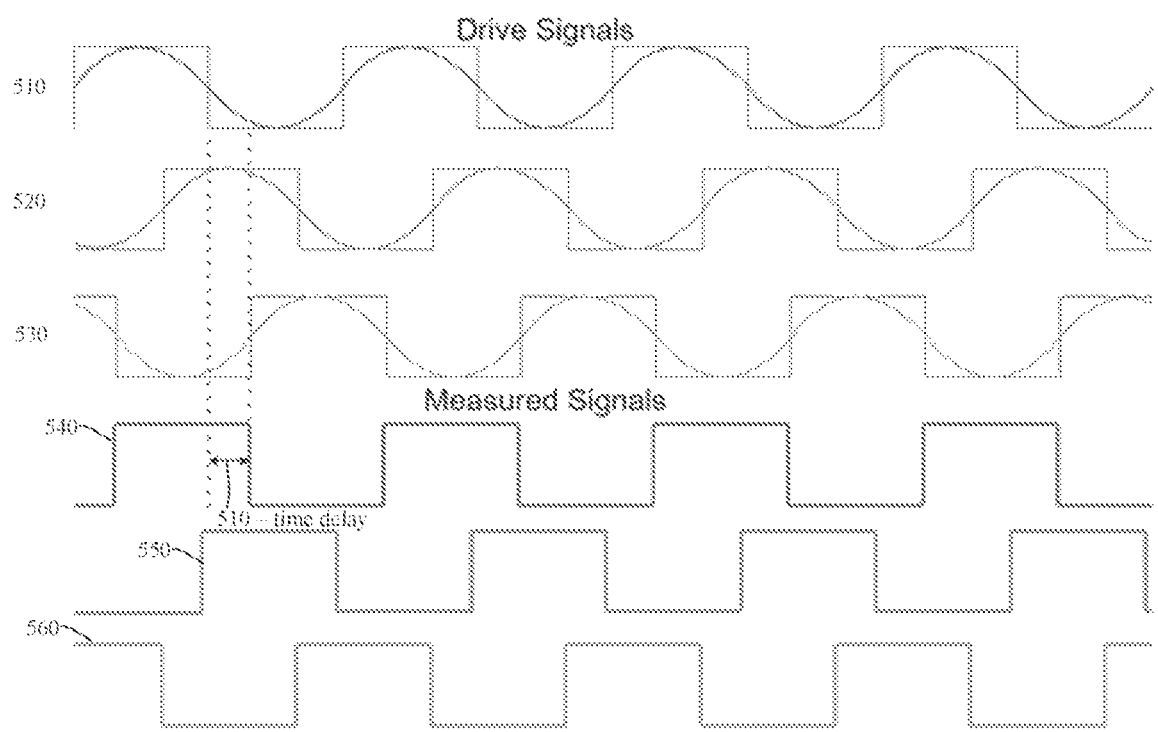
FIG. 5 illustrates example drive signals and the measured drive signals that may result, according to examples of the present disclosure, for each of the PWM signals.

FIG. 5 illustrates example drive signals 510, 520, 530 (Modulated sinusoid, and driven zero-cross signal) and the measured BEMF zero-cross interpretation signals 540, 550, 560 that may result, according to examples of the present disclosure, for each of the driven motor coils.

Shown are filtered modulated drive signals (thus the sinusoid form instead of the PWM modulation form) for each PWM circuit 106, with corresponding driven zero-cross interpretations. BEMF source 104 may be operating with a delay 510 behind the respective drive signal.

The delay means that the drive and motor are not well synchronized, and current consumption may increase. A feedback protocol may be implemented to control the delay 510 of the motor zero-cross versus the driving zero-cross. Depending upon the motor control scheme, or whether the motor is accelerating or deaccelerating, the delay 510 of FIG. 5 may be greater or smaller. When the motor is accelerating, the delay 510 may become greater, while when deaccelerating, the delay 510 may become smaller, or even negative. Thus, the current zero-cross detection may be adjusted by adjusting the frequency of PWM signals or the length of deadtime.

Figure 6:
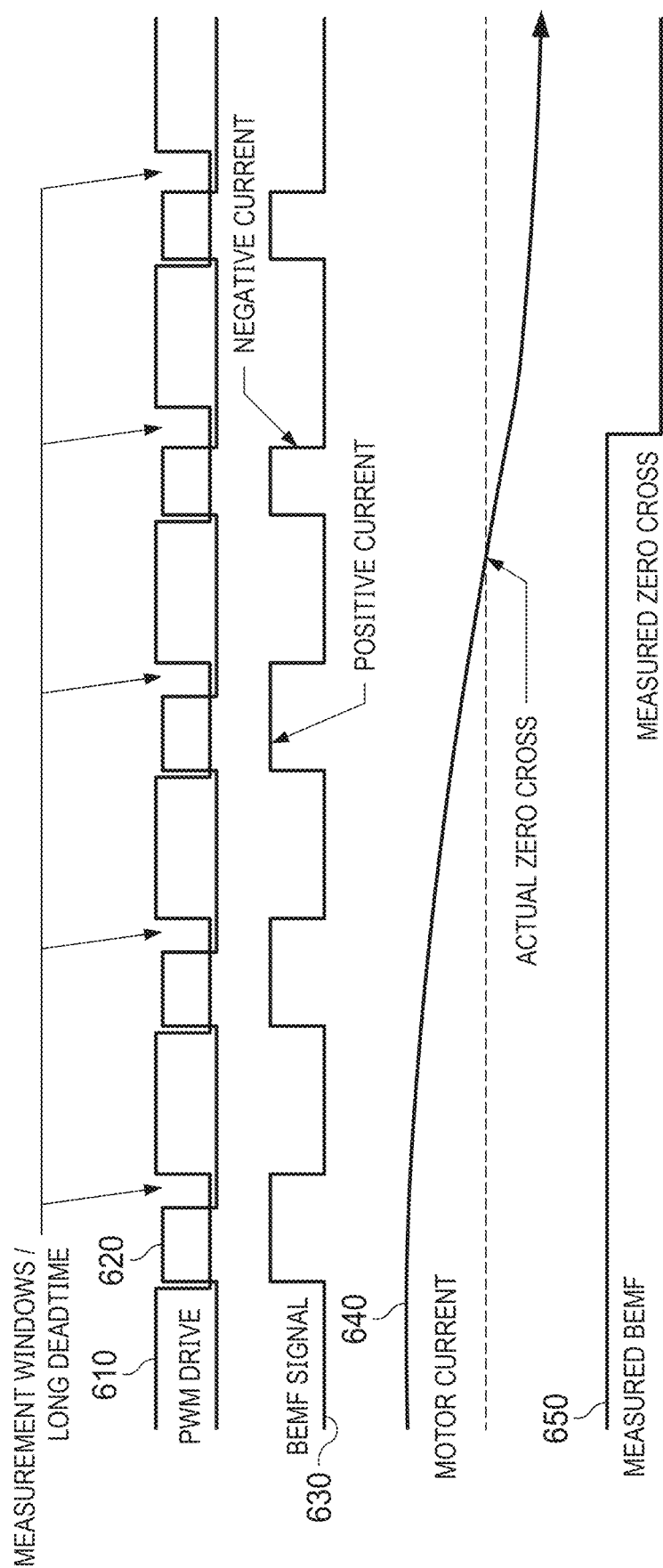
FIG. 6 illustrates example measurement and interpretation of BEMF, according to examples of the present disclosure.

FIG. 6 illustrates example measurement and interpretation of electrical characteristics of the source, such as BEMF, according to examples of the present disclosure. Shown is a PWM drive signal 610 and 620 for high side switch 204 and low side switch 206, respectively of a single PWM circuit 106, a measurement of BEMF signal 630 from midpoint 212, corresponding motor current 640 of BEMF source 104, and a measurement of BEMF signal 650 from comparators or other mechanisms of measurement circuit 108.

The measurement/acquisition window or long deadtime of the PWM drive signals may correspond to the measurement/acquisition windows or long deadtimes of other instances of PWM circuit 106, such that each of PWM circuits 106 share a measurement/acquisition window or deadtime, and all six switches are open at the same time during this measurement/acquisition window or deadtime. A measurement/acquisition of midpoint 212 may be made by measurement/acquisition circuit 108 during each of these measurement/acquisition windows. The value of BEMF signal may reflect the voltage at midpoint 212. Thus, at the first deadtime, a "1" may be measured. At the second deadtime, a "1" may be measured. At the third deadtime, a "1" may be measured. At the fourth deadtime, however, a "0" may be measured. At the fifth deadtime, a "0" may be measured. The transition from a "1" to a "0" being measured may reflect the current of BEMF source 104 switching from current flowing into BEMF source 104 (referred to as positive, from the perspective of PWM circuits 106) to current flowing from BEMF source 104 (referred to as negative, from the perspective of PWM circuits 106). This may be referred to as a "zero cross". The measured BEMF signal may reflect this binary approximation of the sign or polarity of BEMF. System 100 may take any suitable action based upon this measurement of BEMF.

Figure 7:
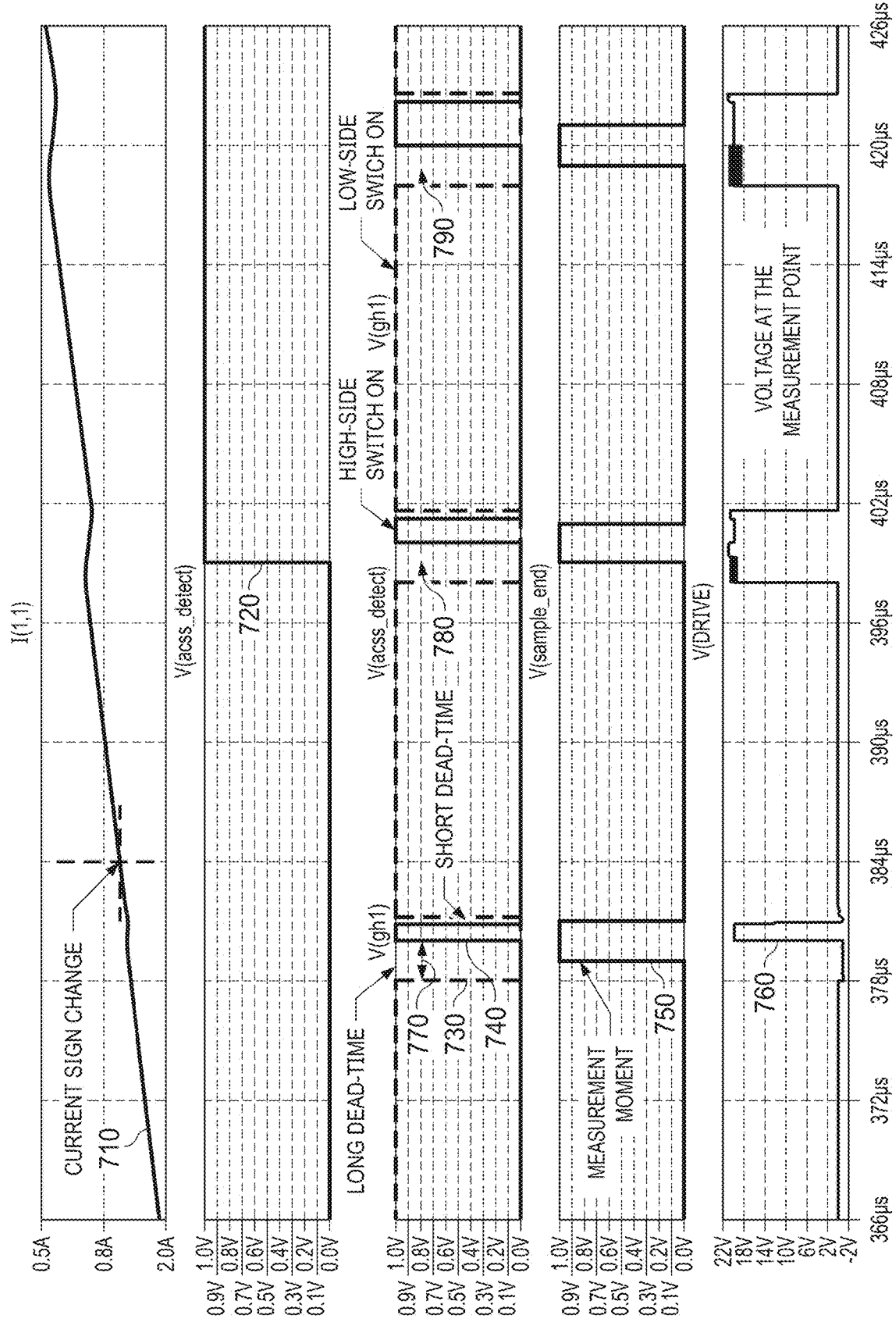
FIG. 7 illustrates further example measurement and interpretation of BEMF, according to examples of the present disclosure.

FIG. 7 illustrates further example measurement and interpretation of BEMF, according to examples of the present disclosure.

In a first trace 710, current through BEMF source 104 may be shown. Current sign or polarity may change.

In a second trace 720, detection of the direction of the current may be represented. This detection may be made based upon information in the traces described below.

In a third trace 730 and fourth trace 740, PWM signals for a given PWM circuit 106 are shown. Three long deadtimes 770, 780, and 790 are shown and are contrasted with short deadtimes. Measurements may be made during the long deadtimes.

In a fifth trace 750, a measurement signal from control circuit 102 to acquisition circuit 108 may be shown. Acquisition/Measurement may take place upon the rising edge of this signal.

In a sixth trace 760, the voltage at midpoint 212 may be shown.

In the first long deadtime 770, the voltage at midpoint 212 may be zero when the measurement command is issued. The first trace may be zero. In the second and third long deadtime 780 and 790, the voltage at midpoint 212 may be one when the measurement command is issued. The second trace may thus be one.

A drawback of some examples may be that, because of the extended deadtime, the full range of PWM might not be used. That is, not all of the available or possible voltage may be deliverable to BEMF source 104. H-bridge body diodes may become hotter because of the longer deadtime.

Examples of the present disclosure may be used in any suitable manner or application, such as motor control for brushless motors, brushless direct current motors, permanent magnet synchronous motors, permanently excited synchronous motors, alternating current induction motors, and externally excited synchronous motors, or on-grid inverters include one to three phases or multiple phase on-grid connected inverters.

We claim:

1. An apparatus, comprising:
   an acquisition circuit; and
   a control circuit to:
   cause a first modulation circuit to issue a first set of modulated signals to a first source of alternating current energy, the first set of modulated signals to have a first deadtime wherein a high side switch and a low side switch of the first modulation circuit are open; and
   cause the acquisition circuit to acquire a first electrical characteristic of the first source of alternating current energy from the first source of alternating current energy during the first deadtime;
   cause a second modulation circuit to issue a second set of modulated signals to a second source of alternating current energy, the second set of modulated signals to have a second deadtime wherein a high side switch and a low side switch of the second modulation circuit are open, the second deadtime synchronous with the first dead time; and
   cause the acquisition circuit to acquire a second electrical characteristic of the second source of alternating current energy from the second source of alternating current energy during the second deadtime,
   wherein a rising first edge of a modulation cycle of the first set of modulated signals and a rising first edge of the second set of modulated signals are synchronous.

2. The apparatus of claim 1, wherein the control circuit is to:
   cause a third modulation circuit to issue a third set of modulated signals to a third source of alternating current energy, the third set of modulated signals to have a third deadtime wherein a high side switch and a low side switch of the third modulation circuit are both open, the third deadtime synchronous with the first deadtime and the second deadtime;
   cause the acquisition circuit to acquire a third electrical characteristic of the third source of alternating current energy from the third source of alternating current energy during the third deadtime.

3. The apparatus of claim 2, wherein the first, second, and third set of modulated signals are to drive a motor or inverter that includes the first, second, and third sources of alternating current energy.

4. The apparatus of claim 2, wherein the first, second, and third set of modulated signals are used as a sinusoidal drive of a motor that includes the first, second, and third sources of alternating current energy.

5. The apparatus of claim 1, wherein:
   the first set of modulated signals is to have a fourth deadtime wherein the high side switch and the low side switch of the first modulation circuit are both open;
   the second set of modulated signals is to have a fifth deadtime wherein the high side switch and the low side switch of the second modulation circuit are both open; and
   the fourth deadtime and the fifth deadtime are at different times than the first deadtime or the second deadtime.

6. A method, comprising:
   from a first modulation circuit, issuing a first set of modulated signals to a first source of alternating current energy, the first set of modulated signals to have a first deadtime wherein a high side switch and a low side switch of the first modulation circuit are both open;
   acquiring a first electrical characteristic of the first source of alternating current energy from the first source of alternating current energy during the first deadtime;
   from a second modulation circuit, issuing a second set of modulated signals to a second source of alternating current energy, the second set of modulated signals to have a second deadtime wherein a high side switch and a low side switch of the second modulation circuit are both open, the second deadtime synchronous with the first deadtime; and acquiring a second electrical characteristic of the second source of alternating current energy from the second source of alternating current energy during the second deadtime, wherein a rising first edge of a modulation cycle of the first set of modulated signals and a rising first edge of the second set of modulated signals are synchronous.

7. The method of claim 6, comprising:
at a third modulation circuit, issuing a third set of modulated signals to a third source of alternating current energy, the third set of modulated signals to have a third deadtime wherein a high side switch and a low side switch of the third modulation circuit are both open, the third deadtime synchronous with the first deadtime and the second deadtime; and acquiring a third electrical characteristic of the third source of alternating current energy from the third source of alternating current energy during the third deadtime.

8. The method of claim 7, comprising driving a motor or inverter including the first, second, and third sources of alternating current energy with the first, second, and third set of modulated signals.

9. The method of claim 7, wherein the first, second, and third set of modulated signals are a sinusoidal drive of a motor including the first, second, and third sources of alternating current energy.

10. The method of claim 6, wherein:
the first set of modulated signals has a fourth deadtime wherein the high side switch and the low side switch of the first modulation circuit are both open;
the second set of modulated signals has a fifth deadtime wherein the high side switch and the low side switch of the second modulation circuit are both open; and
the fourth deadtime and the fifth deadtime are at different times than the first deadtime and the second deadtime.

11. A microcontroller, comprising:
an acquisition circuit;
a first modulation circuit;
a second modulation circuit; and
a control circuit to:
cause the first modulation circuit to drive a first source of alternating current energy with a first set of modulated signals, the first set of modulated signals to have a first acquisition window wherein a high side switch and a low side switch of the first modulation circuit are not conducting; and
cause the acquisition circuit to acquire a first electrical characteristic of the first source of alternating current energy from the first source of alternating current energy during the first acquisition window;
cause the second modulation circuit to drive the second source of alternating current energy with a second set of modulated signals, the second set of modulated signals to have a second acquisition window wherein a high side switch and a low side switch of the second modulation circuit are not conducting; and
cause the acquisition circuit to acquire a second electrical characteristic of the second source of alternating current energy from the second source of alternating current energy during the second acquisition window, the acquisition of the first electrical characteristic and the second electrical characteristic coincident at a same time during the first and second acquisition windows,
wherein the control circuit is to synchronize a rising first edge of a modulation cycle of the first set of modulated signals and a rising first edge of the second set of modulated signals.

12. The microcontroller of claim 11, wherein:
the first set of modulated signals is to have a first deadtime wherein the high side switch and the low side switch of the first modulation circuit are not conducting, the first deadtime outside of the first acquisition window;
the second set of modulated signals is to have a second deadtime wherein the high side switch and the low side switch of the second modulation circuit are not conducting, the second deadtime outside of the second acquisition window; and the first deadtime and the second deadtime do not overlap.

13. The microcontroller of claim 11, comprising a third modulation circuit, wherein the control circuit is to:
cause the third modulation circuit to drive a third source of alternating current energy with a third set of modulated signals, the third set of modulated signals to have a third acquisition window wherein a high side switch and a low side switch of the third modulation circuit are not conducting;
cause the acquisition circuit to acquire a third electrical characteristic of the third source of alternating current energy from the third source of alternating current energy during the third acquisition window, the acquisitions of the first, second, and third electrical characteristics during the first, second, and third acquisition windows.

14. The microcontroller of claim 11, wherein the control circuit is to cause the first, second, and third set of modulated signals to provide a sinusoidal field of control drive of a motor including the first, second, and third sources of alternating current energy.

* * * * *